(12) United States Patent
Hofmann

(10) Patent No.: US 6,540,459 B2
(45) Date of Patent: Apr. 1, 2003

(54) APPARATUS FOR COUNTERBALANCING WEIGHT

(75) Inventor: Klaus Hofmann, Pienzenau (DE)

(73) Assignee: Deckel Maho Geretsried GmbH, Geretsried (DE)

( * ) Notice: Subject to any disclaimer, the term of this patent is extended or adjusted under 35 U.S.C. 154(b) by 0 days.

(21) Appl. No.: 09/863,621

(22) Filed: May 23, 2001

(65) Prior Publication Data

US 2002/0084113 A1 Jul. 4, 2002

(30) Foreign Application Priority Data

May 23, 2000 (DE) .......................... 100 25 355

(51) Int. Cl.⁷ .............................. B23C 9/00; B23Q 11/04
(52) U.S. Cl. .................... 409/237; 408/235; 82/152
(58) Field of Search ................... 409/237, 236, 409/238, 239; 408/235; 83/748; 82/152, 903

(56) References Cited

U.S. PATENT DOCUMENTS

| | | | | |
|---|---|---|---|---|
| 1,577,975 A | * | 3/1926 | Klausmeyer | 408/235 |
| 1,959,435 A | * | 5/1934 | Marsilius | 409/237 |
| 2,232,146 A | * | 2/1941 | Simmon | 248/590 |
| 3,216,032 A | * | 11/1965 | Hoffman | 408/235 |
| 3,845,942 A | * | 11/1974 | Roeder | 408/235 |
| 4,033,532 A | * | 7/1977 | Bergquist et al. | 408/235 |
| 4,869,626 A | * | 9/1989 | Kosmowski | 408/235 |
| 5,370,481 A | * | 12/1994 | Altmann et al. | 408/235 |

FOREIGN PATENT DOCUMENTS

| | | | | |
|---|---|---|---|---|
| DE | 8401953 U1 | * | 7/1984 | |
| FR | 2504237 A1 | * | 10/1982 | |
| GB | 1384344 A | * | 2/1975 | |
| JP | 61146441 | | 7/1986 | |
| SU | 350598 A | * | 10/1972 | ........ 408/235 |

* cited by examiner

Primary Examiner—A. L. Wellington
Assistant Examiner—Erica E Cadugan
(74) Attorney, Agent, or Firm—The Maxham Firm

(57) ABSTRACT

The invention relates to an apparatus for counterbalancing the weight of movable machine parts of a machine tool. A simply and compactly designed apparatus of this kind enabling a weight compensation even without complex pressure supplies is, according to the invention, characterized in that it comprises one or more helical springs (1;15 to 18) the one end (7, 29) of which is connected to the movable machine part (12; 35) for generating a counter-force counteracting the weight force for the movable machine part.

9 Claims, 3 Drawing Sheets

APPARATUS FOR COUNTERBALANCING WEIGHT

BACKGROUND OF THE INVENTION

The invention relates to an apparatus for counterbalancing the weight of movable machine components of a machine tool.

In the field of machine tools the weight of the vertically movable machine parts is often counterbalanced by counterweights to decrease the driving power during lifting operations as well as to increase the acceleration, said counterweights being connected to the movable machine parts such as, for example, milling units, consoles or transverse beams via roller chains or ropes. Particularly in machine tools of compact construction, however, there is no space for such counterweights and the additionally required guidances.

Therefore, a hydraulic or hydro-pneumatic weight counterbalance is also used already in which the weight of a vertically shiftable machine part is compensated by one or more pressure cylinders. However, corresponding means for the pressure means supply and control members for adjusting and maintaining the pressure in the pressure cylinders are required in this type of weight compensation.

SUMMARY OF THE INVENTION

It is the object of the invention to provide an apparatus of the type mentioned at the beginning which is simple and compact in design and will also enable weight compensation without complex pressure means supplies and control means.

According to the invention said object is solved in that the apparatus comprises one or more helical springs one end of which is connected to a stationary component and the other end of which is connected to the movable machine part to generate a counter-force counteracting the weight force of the movable machine part.

With the apparatus according to the invention particularly the weight force of vertically or obliquely movable machine parts may be totally or partially counterbalanced with simple means. In this way the driving power required for lifting the machine parts can be reduced. The feeding drive is less strained even when larger masses are lifted, and a greater acceleration is obtainable.

Efficacious embodiments and advantageous forms of the invention are indicated in the sub-claims.

Thus, the apparatus comprises a plurality of parallel connected helical springs in a particularly efficacious embodiment, said helical springs being disposed between the machine part to be moved and a stationary component. With a plurality of helical springs the spring characteristic may be optimally adjusted to the prevailing requirements. In addition, safety is provided for the case that a break or the like occurs in one of the helical springs.

In an embodiment sealed towards the outside to a large extent the inner end of the helical springs is attached to an axis and the other to a housing concentric with respect to the axis. The axis may be arranged so as to be stationary, and the housing may be formed so as to be turnable. However, the housing may as well be designed so as to be stationary, and the axis may be formed so as to be rotatable.

In an embodiment with a fixed axis and a movable housing the latter is advantageously connected to the machine part to be moved via a gear belt capable of enduring great loads which will be wound up on the efficaciously drum shaped central part of the housing when the machine part is lifted. However, other pulling elements may also be used for connecting the housing with the shiftable machine part.

According to another efficacious embodiment the helical springs disposed adjacent to each other are separated from each other by spacer disks. In this way an undesired friction between the individual springs may be prevented.

For biasing the helical springs a corresponding adjustment flange may be provided on the axis which flange can be turned via radial bores and fixed on an angular console or another stationary machine part in a desired angular position via front side fixing screws or the like.

BRIEF DESCRIPTION OF THE DRAWING

Other particularities and advantages of the invention will become obvious from the following description of advantageous embodiments with reference to the drawing in which.

DETAILED DESCRIPTION OF THE PREFERRED EMBODIMENTS

Figure 1:
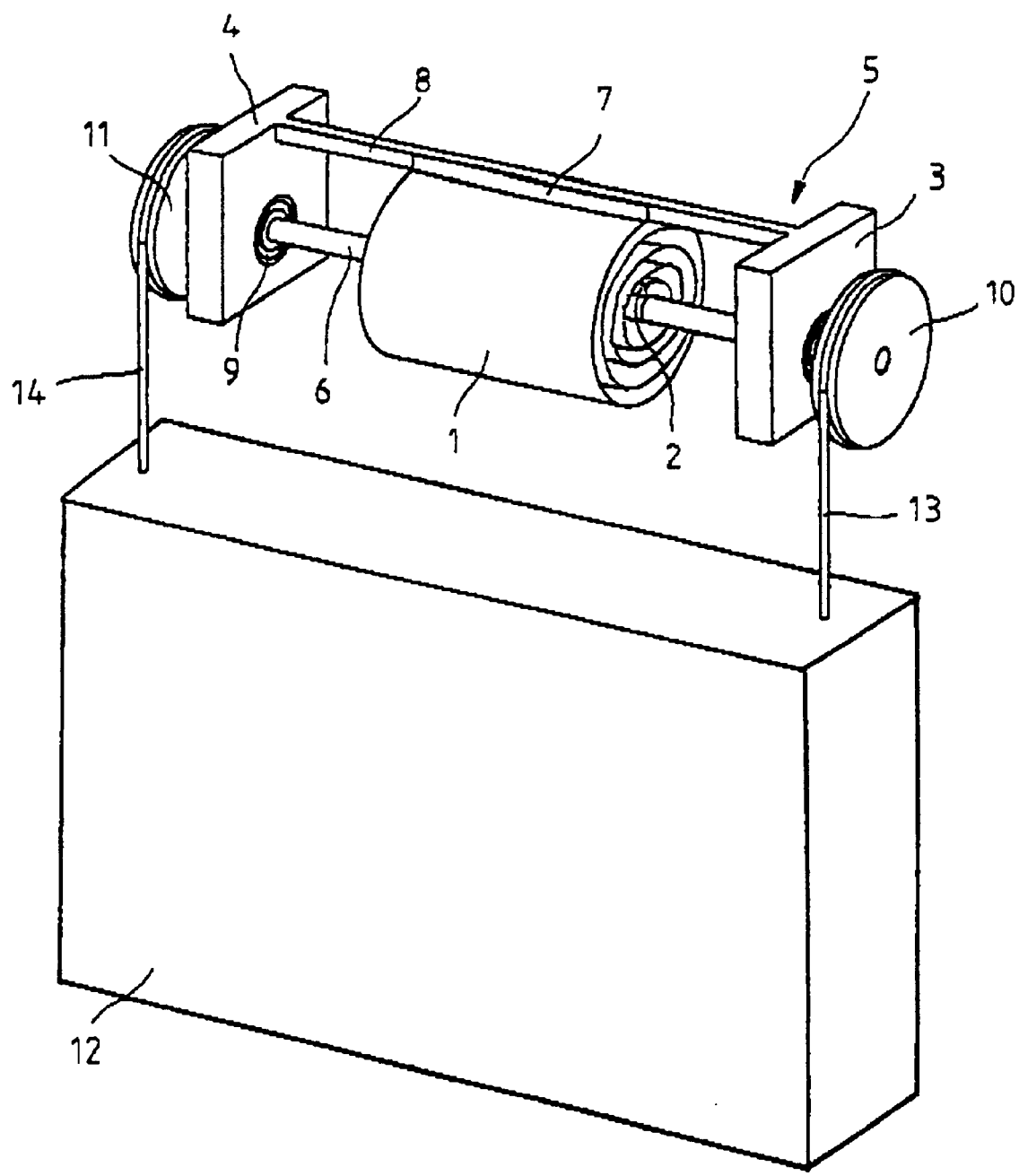
FIG. 1 is a considerably simplified schematic illustration of a first embodiment of an apparatus for counterbalancing weight.
Figure 2:
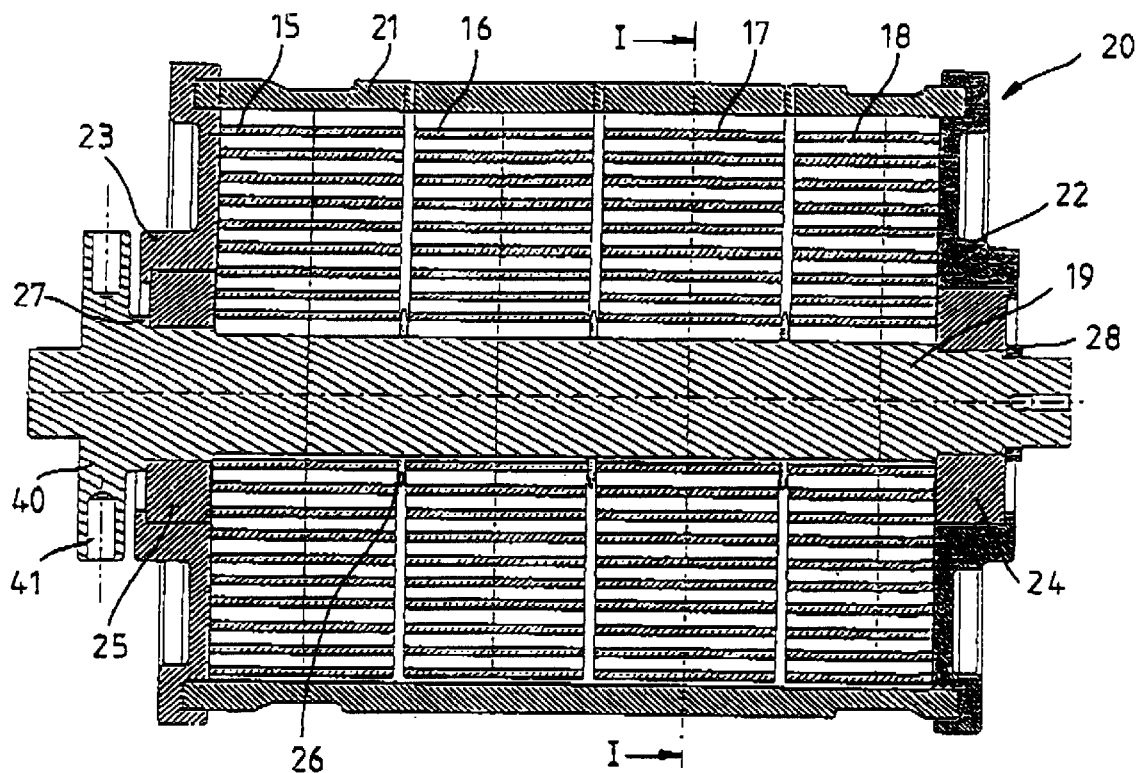
FIG. 2 is a longitudinal cross sectional view of another embodiment of an apparatus for counterbalancing weight.

The apparatus schematically shown in FIG. 1 for counterbalancing the weight of a movable machine part of a machine tool comprises a helical spring 1 of a helically wound spring steel ligament the inner end 2 of which is attached to an axis 6 turnably borne in two lateral components 3 and 4 of a stationary support element 5 and the outer 7 end of which is attached to a fixed connection bridge 8 between the two lateral components 3 and 4 of the support element 5. On the two ends of the axis 6 turnably held in the two lateral components 3 and 4 by corresponding bearings 9, which ends laterally protrude over the lateral components 3 and 4, a roller 10 or 11 is mounted, respectively, so as not to be turnable. The upper end portions of two ropes 13 and 14 fixed to a machine part 12 are attached to and guided by the rollers 10, 11 so as to be wound up and unwound when the machine part 12 is lifted or lowered. With a corresponding biasing of the helical spring 1 thus the weight force of the machine part 12 to be moved can be totally or partly compensated by the spring force. In this way the driving power of a feeding drive required for lifting the machine part 12 can be clearly reduced, and smaller dimensioned driving motors will be sufficient for the feeding drive.

In FIGS. 2 to 5 an actual embodiment of an apparatus for weight counterbalancing according to the invention attached to a vertically shiftable headstock of a vertical machining centre is shown. In this embodiment four helical springs 15 to 18 consisting of a spring steel ligament having a rectangular cross section are arranged around an axis 19 within a housing 20. According to FIG. 2 the housing 20 contains a drum 21 concentric to the axis 19 and two end side bearing covers 22 and 23 by which the housing 20 is turnably held on the axis 19 by means of bearings 24 and 25. The individual helical springs 15 to 18 are separated from each other by spacer disks 26 for preventing friction or other mutual interference. The housing 20 with the bearing 24 and 25 is fixed in the axial direction by a shoulder 27 on the one side of the axis 19 and an end disk 28 attachable to the other side of the axis 19. In another embodiment, however, the housing may be fixed as well and the axis may formed so as to be turnable as shown in the principle illustration of FIG. 1.

Figure 3:
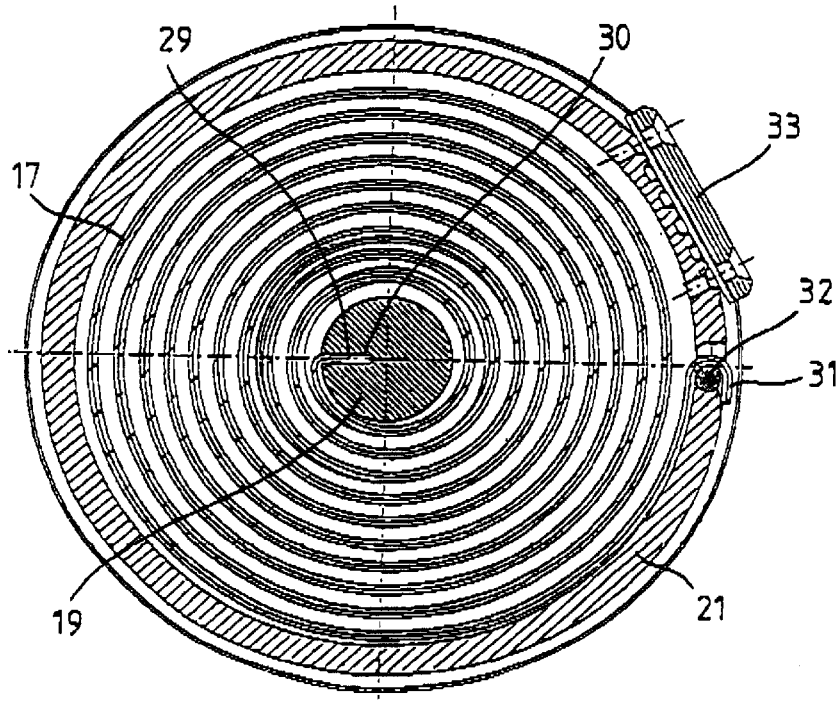
FIG. 3 is a cross sectional view along the line I—I of FIG. 2.

As can be seen from FIG. 3 the inner end 29 of each spring 15 to 18 is fixed to the axis via a lateral slit 30. The outer end 31 of the springs 15 to 18 is bent around a rod 32 for an attachment to the drum 21, said rod extending in the axial direction of the axis 19 in a corresponding recess in the drum 21. In addition, a clamping strip 33 for fixing a gear belt 34 shown in FIG. 4 is screwed to the outer side of the drum 21, the drum 21 of the turnable housing 20 being connected to a headstock 35 only partly shown in FIG. 5 and shiftable along the vertical axis by a feeding drive (not shown) by said gear belt 24.

Figure 4:
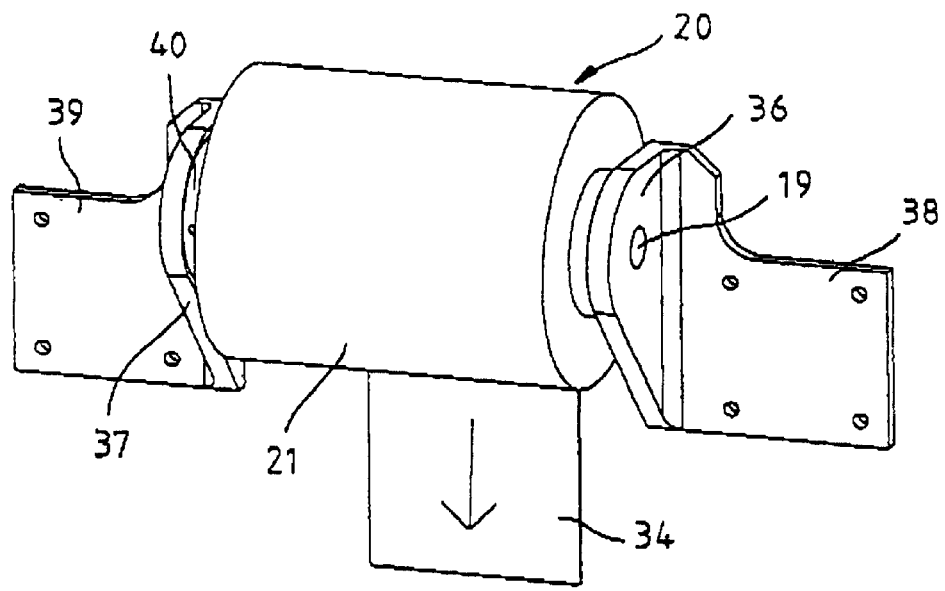
FIG. 4 is a perspective view of the apparatus shown in FIGS. 2 and 3 and comprising a gear belt and lateral angular supports.
Figure 5:
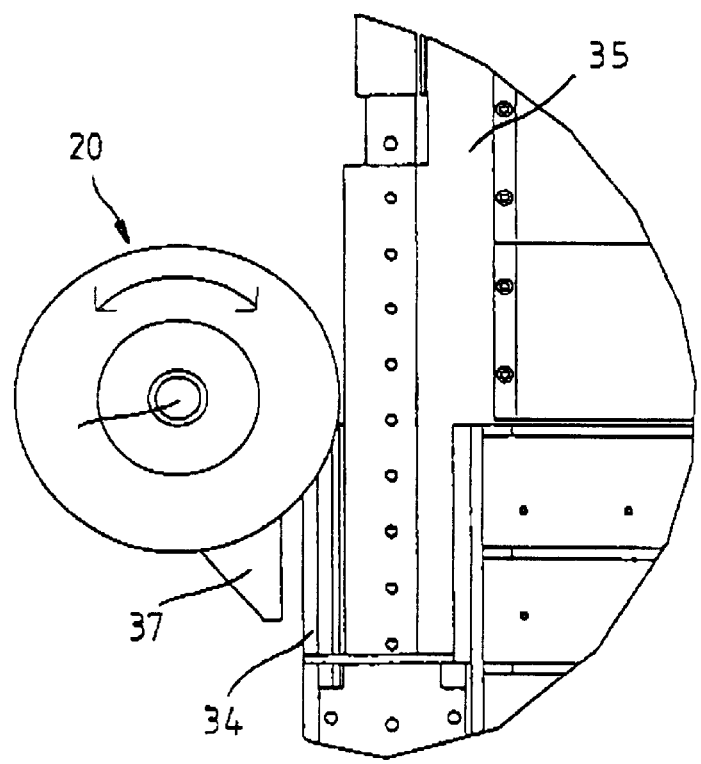
FIG. 5 illustrates the apparatus shown in FIG. 4 disposed on a partially indicated headstock of a vertical machining centre.

According to FIGS. 4 and 5 the axis 19 is held in forward protruding support parts 36 and 37 of two angular supports 38 and 39 so as to be secured against a rotation. The apparatus for counterbalancing weight is attachable to a stationary part of the machine tool via the two angular supports 38 and 39. On one end of the axis 19 a flange 40 particularly visible in FIG. 2 and having radial bores 41 for adjusting a biasing of the helical springs 15 to 18 is provided. For maintaining an adjusted biasing, the axis 19 can be fixed in a certain angular position, for example with respect to the support part 37, via lateral fixing screws (not shown).

With the embodiment of an apparatus according to the invention described above and shown in the drawings the weight of, for example, a machining unit shiftable along the vertical be counterbalanced. However, the invention is not limited to this embodiment but can also be applied to counterbalancing the weight of other vertically or transversely shiftable machine parts.

What is claimed is:

1. Apparatus for counterbalancing the weight of a vertically or transversely movable part of a machine tool comprising:

a spring element;

a flexible pulling member; and an axis and a housing drum mounted to rotate about said axis, said spring element having a first end connected to said axis and secured against rotation, and another end of said spring element connected to said housing drum to provide a counter-force counteracting the weight force of the movable machine part from said spring element, wherein said spring is connected to the movable part via said flexible pulling member and wherein said flexible pulling member is a belt axially extending on said drum and being wound on or unwound from said housing drum in accordance with rotation of the housing drum.

2. Apparatus according to claim 1, characterized in that the spring element comprises a plurality of helical springs disposed in said housing drum adjacent to each other.

3. Apparatus according to claim 2, characterized in that said helical springs are distanced from each other by spacer disks.

4. Apparatus according to claim 3, characterized in that the helical springs each comprise a spring steel ligament having a rectangular cross section.

5. Apparatus according to claim 1, characterized in that said flexible pulling member is a gear belt.

6. Apparatus according to claim 2, characterized in that said flexible pulling member is a gear belt.

7. Apparatus according to one of claims 5 or 6, characterized in that said spring element comprises a plurality of helical springs distanced from each other by spacer disks.

8. Apparatus according to one of the claims 2 or 3, comprising means for biasing the helical springs.

9. Apparatus according to claim 8, characterized in that said means for biasing the helical springs comprises an adjusting flange provided on the axis, said flange being fixable in one of a plurality of predetermined angular positions.

* * * * *